United States Patent
Sutton

(10) Patent No.: US 10,990,434 B2
(45) Date of Patent: Apr. 27, 2021

(54) INCREASING PROCESSING CAPACITY OF VIRTUAL MACHINES FOR AN ABNORMAL EVENT

(71) Applicant: International Business Machines Corporation, Armonk, NY (US)

(72) Inventor: Peter G. Sutton, Lagrangeville, NY (US)

(73) Assignee: International Business Machines Corporation, Armonk, NY (US)

(*) Notice: Subject to any disclaimer, the term of this patent is extended or adjusted under 35 U.S.C. 154(b) by 67 days.

(21) Appl. No.: 16/268,059

(22) Filed: Feb. 5, 2019

(65) Prior Publication Data

US 2020/0249974 A1 Aug. 6, 2020

(51) Int. Cl.
G06F 9/455 (2018.01)

(52) U.S. Cl.
CPC ............ *G06F 9/45558* (2013.01); *G06F 2009/45591* (2013.01)

(58) Field of Classification Search
CPC .......... G06F 9/505; G06F 9/45558; G06F 2009/45591
See application file for complete search history.

(56) References Cited

U.S. PATENT DOCUMENTS

| | | | |
|---|---|---|---|
| 5,649,093 | A | 7/1997 | Hanko et al. |
| 7,137,034 | B2 | 11/2006 | Largman et al. |
| 7,433,945 | B2 | 10/2008 | Ng et al. |
| 7,676,683 | B2 | 3/2010 | Tsuji et al. |
| 7,721,292 | B2 | 5/2010 | Frasier et al. |
| 7,861,117 | B2 | 12/2010 | Coronado et al. |
| 8,060,610 | B1 | 11/2011 | Herington |
| 8,082,433 | B1 | 12/2011 | Fallone et al. |
| 8,171,276 | B2 | 5/2012 | Fried |
| 8,219,653 | B1 | 7/2012 | Keagy et al. |
| 8,443,077 | B1 | 5/2013 | Lappas et al. |
| 8,464,250 | B1 | 6/2013 | Ansel |
| 8,495,512 | B1 | 7/2013 | Lappas et al. |
| 8,627,133 | B2 | 1/2014 | Tsirkin et al. |
| 8,898,246 | B2 | 11/2014 | Gostin et al. |
| 8,954,797 | B2 | 2/2015 | Busaba et al. |
| 9,130,831 | B2 | 9/2015 | Cao et al. |
| 9,146,608 | B2 | 9/2015 | Bieswanger et al. |

(Continued)

FOREIGN PATENT DOCUMENTS

CN 103049309 B 9/2017

OTHER PUBLICATIONS

Regenscheid, A., "Platford Firmware Resiliency Guidelines," Draft NIST Special Publication 800-193, Released May 30, 2017 (Publication Date: May 2018), 47 pages.

(Continued)

*Primary Examiner* — Brian W Wathen
(74) *Attorney, Agent, or Firm* — Mark Bergner

(57) ABSTRACT

A system and related method provides within a data processing system (DPS), a first set of computing resources comprising a set of processor units that comprises a first core in an active state, and a second core that is initially in an inactive state. The processor allocates, for a partition that is hosted on the DPS, the first set of computing resources. The partition is operated using the first core before the second core has been activated. A resource manager determines whether to increase processing capacity based on an abnormal event. The processor then activates the second core from the inactive state to the active state. The partition is then operated using both the first and second (activated). In response to a predefined criterion, the second core is deactivated from the active state to the inactive state.

21 Claims, 8 Drawing Sheets

(56) References Cited

U.S. PATENT DOCUMENTS

| | | | |
|---|---|---|---|
| 9,146,760 | B2 | 9/2015 | Powell et al. |
| 9,164,784 | B2 | 10/2015 | Otte et al. |
| 9,201,661 | B2 | 12/2015 | Lin et al. |
| 9,253,048 | B2 | 2/2016 | Bhogal et al. |
| 9,280,371 | B2 | 3/2016 | Garza et al. |
| 9,288,117 | B1 | 3/2016 | Angrish et al. |
| 9,563,777 | B2 | 2/2017 | Deng et al. |
| 9,569,275 | B2 | 2/2017 | Clay et al. |
| 9,626,210 | B2 | 4/2017 | Phillips et al. |
| 9,742,866 | B2 | 8/2017 | Shribman et al. |
| 9,891,953 | B2 | 2/2018 | Beveridge et al. |
| 10,185,670 | B2 | 1/2019 | Litichever et al. |
| 10,289,403 | B1 | 5/2019 | Krishnaswamy et al. |
| 2003/0009654 | A1 | 1/2003 | Nalawadi et al. |
| 2005/0081210 | A1 | 4/2005 | Day et al. |
| 2008/0082983 | A1 | 4/2008 | Groetzner et al. |
| 2010/0107159 | A1 | 4/2010 | Radhalaishnan et al. |
| 2010/0153763 | A1 | 6/2010 | Sood |
| 2011/0010714 | A1* | 1/2011 | Powell ............... G06F 9/45533 718/1 |
| 2011/0239010 | A1 | 9/2011 | Jain et al. |
| 2013/0117168 | A1 | 5/2013 | Sandstrom |
| 2013/0144744 | A1* | 6/2013 | Astete ............... G06Q 30/0601 705/26.1 |
| 2013/0290958 | A1 | 10/2013 | Ansel |
| 2014/0007097 | A1* | 1/2014 | Chin ................... G06F 9/5077 718/1 |
| 2014/0059542 | A1* | 2/2014 | Ashok ................. G06F 9/5077 718/1 |
| 2014/0380312 | A1 | 12/2014 | Ansel |
| 2015/0052081 | A1 | 2/2015 | Duron et al. |
| 2015/0127975 | A1 | 5/2015 | Patterson et al. |
| 2015/0248341 | A1 | 9/2015 | Cabrera et al. |
| 2017/0083371 | A1* | 3/2017 | Beveridge ............ H04L 67/22 |
| 2017/0109204 | A1* | 4/2017 | Feng ................... G06F 9/5083 |
| 2017/0155560 | A1 | 6/2017 | Lee et al. |
| 2017/0178041 | A1 | 6/2017 | Li et al. |

OTHER PUBLICATIONS

Disclosed Anonymously, "Recovering a partition on a server outage using cluster aware Virtual Input-Output Servers," IP.Com No. IPCOM000246353D, Jun. 2, 2016, 3 pages.

"Z/OS concepts," z/OS Basic Skills Information Center, 120 pages, Copyright IBM Corp. 2006, 2010.

Compton et al., "Increasing Resources for Partition to Compensate for Input/Output (I/O) Recovery Event," U.S. Appl. No. 16/376,013, filed Apr. 5, 2019.

List of IBM Patents or Patent Applications Treated as Related, Signed May 29, 2020, 2 pages.

AL-Ghamdi, M., "Proactive Workload Forecasting Model with Dynamic Resource Allocation for Modern Internet Application," 2014 IEEE/ACM 7th International Conference on Utility and Cloud Computing, pp. 396-403, © 2014 IEEE.

Anonymous, "Method to Manage Resource Affinity While Scaling Vertically in a Cloud Computing Environment," IP.com No. IPCOM000234981D, Feb. 20, 2014, 5 pgs.

Anonymous, "System and Method for Determining Resource Monitoring Thresholds Base on Workload and Performance," IP.com No. IPCOM000228218D, Jun. 13, 2013, 3 pgs.

IBM, "SLA based autonomic optimzation of infrastructure," an IP.com Prior Art Database Technical Disclosure, original publication date Dec. 6, 2004, IP.com No. IPCOM000033318D, 4 pgs.

List of IBM Patents or Patent Applications Treated as Related, Jan. 25, 2019, 2 pgs.

Mell et al., "The NIST Definition of Cloud Computing," Recommendations of the National Institute of Standards and Technology, U.S. Department of Commerce, Special Publication 800-145, Sep. 2011, 7 pgs.

Microsoft, "Prevent Unexpected Charges with Azure Billing and Cost Management," https://docs.microsoft.com/en-us/azure/billing/billing-getting-started#ways-to-monitor-your-costs-when-using-azure-services, Jan. 24, 2018, printed May 18, 2018, 12 pgs.

Paul et al., "Modeling and Simulation of Steady State and Transient Behaviors for Emergent SoCs," ISSS'01, Oct. 1-3, 2001, 6 pgs.

Sutton et al., "Increasing Processing Capacity of Processor Cores During Initial Program Load Processing," Application No. 16/184,023, filed Nov. 8, 2018.

Sutton et al., "Increasing Processing Capacity of Virtual Machines," Application No. 16/184,021, filed Nov. 8, 2018.

Sutton, et al. "Increasing Processing Capacity of Processor Cores During Initial Program Load Processing," Application No. 16/184,017, filed Nov. 8, 2018.

International Search Report and Written Opinion dated Mar. 16, 2020 for Application PCT/EP2020/052028, 17 pgs.

* cited by examiner

INCREASING PROCESSING CAPACITY OF VIRTUAL MACHINES FOR AN ABNORMAL EVENT

BACKGROUND

Disclosed herein is a data processing system to dynamically increase processing capacity of one or more virtual machines executing on corresponding partitions of the data processing system when an abnormal event occurs.

Organizations commonly use network data processing systems in manufacturing products, performing services, internal activities, and other suitable operations. Some organizations use network data processing systems in which the hardware and software are owned and maintained by the organization. These types of network data processing systems may take the form of local area networks, wide area networks, and other suitable forms. These types of networks place the burden of maintaining and managing the resources on the organization. In some cases, an organization may outsource the maintenance of a network data processing system. Other organizations may use network data processing systems in which the hardware and software may be located and maintained by a third party. With this type of organization, the organization uses computer systems to access the network data processing system. With this type of architecture, the organization has less hardware to use and maintain.

This type of network data processing system also may be referred to as a cloud. In a cloud environment, the cloud is often accessed through the internet in which the organization uses computers or a simple network data processing system to access these resources. Further, with a cloud, the number of computing resources provided to an organization may change dynamically. For example, as an organization needs more computing resources, the organization may request those computing resources.

As a result, organizations that use clouds do not own the hardware and software. Further, these organizations avoid capital expenditures and costs for maintenance of the computing resources. The organizations pay for the computing resources used. The organizations may be paid based on the resources actually used, such as actual processing time and storage space, or other use of resources. The organizations also may pay for fixed amounts of computing resources periodically. For example, an organization may pay for a selected amount of storage and processing power on a monthly basis. This usage is similar to resources, such as electricity or gas.

Although this disclosure includes a detailed description on cloud computing, implementation of the teachings recited herein is not limited to a cloud computing environment. Rather, embodiments are capable of being implemented in conjunction with any other type of computing environment now known or later developed.

SUMMARY

According to one or more embodiments, a computer-implemented method includes using a processor for providing, within a data processing system (DPS), a first set of computing resources comprising a set of processor units. The set of processor units comprises one or more first cores in an active state, and one or more second cores that are initially in an inactive state. The one or more second cores, while in the inactive state, represents latent CPU capacity (LCC) pre-existing within the set of processor units. The processor allocates, for a partition that is hosted on the DPS, the first set of computing resources comprising the set of processor units with the one or more first cores in an active state. The partition is operated using the one or more first cores before the one or more second cores have been activated. A resource manager determines whether to increase processing capacity for the partition utilizing the LCC based on an occurrence of an abnormal event. In response to the determining of the increase, the processor activates the one or more second cores from the inactive state to the active state. The partition is then operated using both the one or more first cores and the one or more second cores after the one or more second cores has been activated. In response to a predefined criterion, the one or more second cores are deactivated from the active state to the inactive state.

According to one or more embodiments, a computer-implemented method includes using a processor for providing, within a data processing system (DPS), a first set of computing resources comprising a set of processor units, the set of processor units comprising one or more first cores in an active state, and one or more second cores that are initially in an inactive state. The one or more second cores, while in the inactive state, represents latent CPU capacity (LCC) pre-existing within the set of processor units. The processor allocates, for a partition that is hosted on the DPS, the first set of computing resources comprising the set of processor units with the one or more first cores in an active state. The partition is operated using the one or more first cores before the one or more second cores have been activated. A resource manager determines whether to increase processing capacity for the partition utilizing the LCC based on an occurrence of an abnormal event. In response to the determining of the increase, the one or more second cores are activated from the inactive state to the active state. The partition is then operated using both the one or more first cores and the one or more second cores after the one or more second cores has been activated. In response to a predefined criteria, the one or more second cores are deactivated from the active state to the inactive state. The processor performs at least one of logging, tracking, or auditing information related to activation and deactivation of the one or more second cores.

According to one or more embodiments, a computer-implemented method for measuring and reporting increased processing capacity of virtual machines triggered by an abnormal event comprises using a processor for determining that additional resource have been applied to a partition to increase processing capacity for the partition triggered by an occurrence of an abnormal event. The processor then determines an extent and duration of the application of the additional resources, and performs at least one of logging, tracking, or auditing information related to activation and deactivation of the additional processing resources.

According to one or more embodiments, a computer system is provided for increasing processing capacity of virtual machines for an abnormal event. The computer system comprises a processor configured to execute instructions that, when executed on the processor, cause the processor to provide, within a data processing system (DPS), a first set of computing resources comprising a set of processor units. The set of processor units comprises one or more first cores in an active state, and one or more second cores that are initially in an inactive state. The one or more second cores, while in the inactive state, represents latent CPU capacity (LCC) pre-existing within the set of processor units. The system allocates, for a partition that is hosted on the DPS, the first set of computing resources comprising the set of processor units with the one or more first cores in an active state. The system operates the partition using the one or more first cores before the one or more second cores have been activated. A resource manager determines whether to increase processing capacity for the partition utilizing the LCC based on an occurrence of an abnormal event. In response to the determination of the increase, the system activates the one or more second cores from the inactive state to the active state, and operates the partition using both the one or more first cores and the one or more second cores after the one or more second cores has been activated. In response to a predefined criterion, the system deactivates the one or more second cores from the active state to the inactive state.

According to one or more embodiments, a computer program product comprises a computer-readable storage medium having computer-readable program code embodied on it to, when executed on a processor, provide, within a data processing system (DPS). A first set of computing resources comprises a set of processor units, the set of processor units comprise one or more first cores in an active state, and one or more second cores that are initially in an inactive state. The one or more second cores, while in the inactive state, represents latent CPU capacity (LCC) pre-existing within the set of processor units. The processor, using the program code, allocates, for a partition that is hosted on the DPS, the first set of computing resources comprising the set of processor units with the one or more first cores in an active state, and operates the partition using the first core before the second core has been activated. The code allows a resource manager to receive an increase indication to increase processing capacity for the partition utilizing the LCC based on an occurrence of an abnormal event. The code directs the process to, in response to the increase request, activate the second core from the inactive state to the active state and operate the partition using both the first and second core after the second core has been activated. The code directs the processor to, in response to a predefined criteria, deactivate the second core from the active state to the inactive state.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The following detailed description may be taken in conjunction with the accompanying drawings, briefly described directly below and discussed in more detail in the following

DETAILED DESCRIPTION

Figure 1:
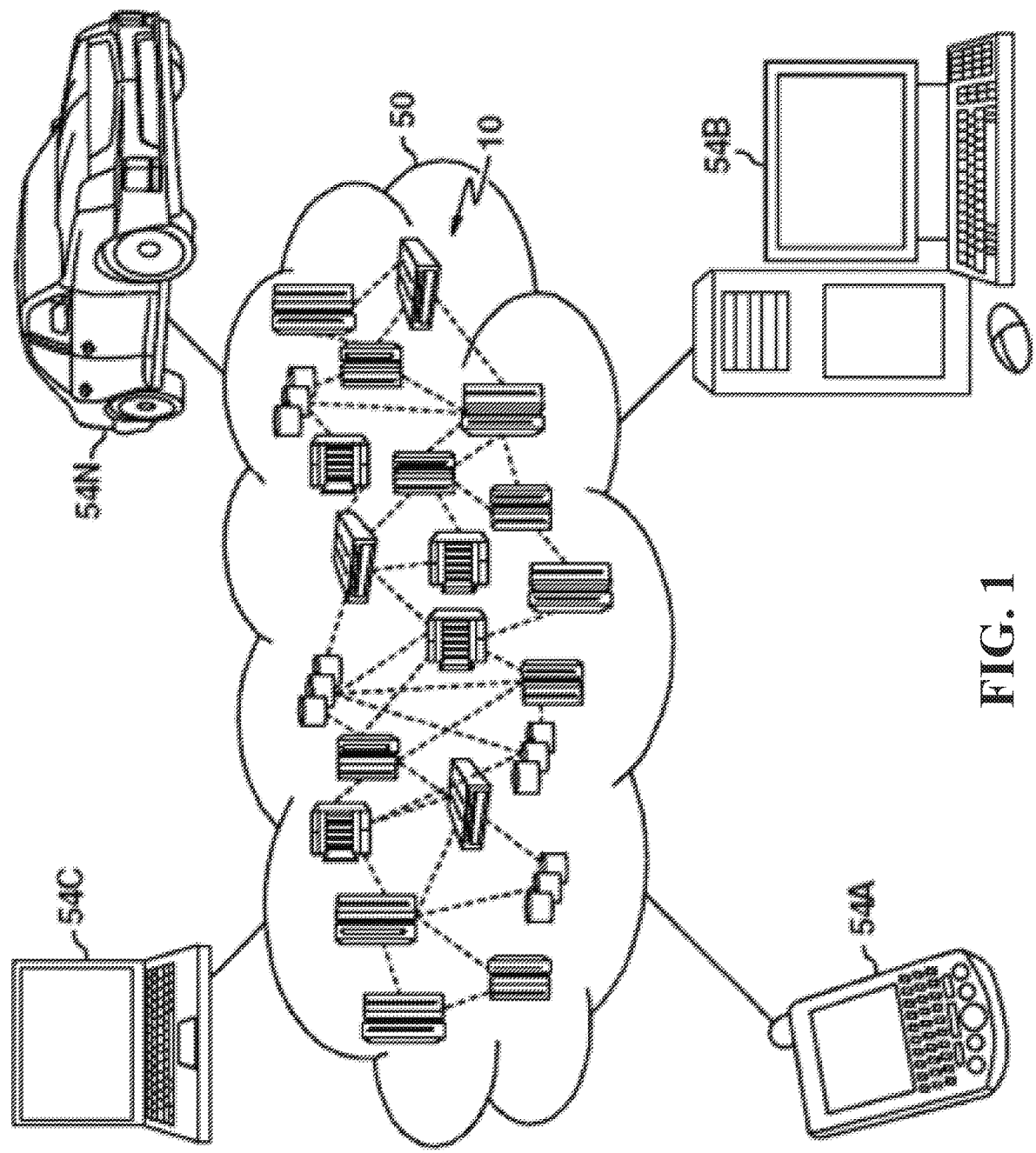
FIG. 1 is a pictorial diagram illustrating an example of a cloud computing environment according to one or more embodiments disclosed herein.

One or more embodiments disclosed herein may facilitate delivery of additional computing resources following detection of abnormal events. Typical computing systems provide degraded performance following a variety of abnormal events. The degraded performance may also be caused due to collection of diagnostic information, application of hardware and software service patches, updates following such abnormal events, and recovery from a system outage. Collecting the diagnostic information may include collection of dumps and traces.

Recovering from the abnormal event may further take substantial time and resources, for example, because of a triggered IPL, or booting of one or more partitions of the computing system. Additional time may be required because such operations (collecting diagnostic information/recovery) may include workloads above a typical expected system workload during normal operation. Alternatively, or in addition, the performance of the computing system may degrade because of planned events such as initial program loading (booting), or scheduled update/patch etc. Additional computing resources may be added to the computing system to mitigate the duration of degraded performance and to allow a performance increase following an outage, or during the scheduled operations that include additional workload.

The following definitions are used below:

abnormal event: An abnormal event is an event occurring outside of normal operation. It may include, but is not limited to, any one of the events of hardware failures, software failures, collecting diagnostic information, application of a hardware and/or software service patch, a planned or unplanned shutdown of a running system, outage, and the like. Abnormal events may include a condition that affects the ability of computing systems, such as a computer server system, to deliver expected levels of output, such as processing capacity. Abnormal events do not include normal operation events such as spiking workloads.

inferred [resource] request [to the resource manager] A determination made by the resource manager that more resources should be provided according to a set of rules, but not based on an actual communicated request by a system entity.

[resource] request [to the resource manager] An actual or inferred request for more resources to the resource manager made by the resource manager receiving an actual request from a system entity.

The following acronyms may be used below:
ARM advanced RISC machine
CD-ROM compact disc ROM
CoD capacity on demand
CPU central processing unit
CUoD capacity upgrade on demand
DPS data processing system
DVD digital versatile disk EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
LTA logging/tracking/audit
PaaS platform as a service
PDA personal digital assistant
PLA programmable logic arrays
RAM random access memory
RISC reduced instruction set computer
ROM read-only memory
SaaS software as a service
SLA service level agreement
SRAM static random access memory
WAN wide-area network It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
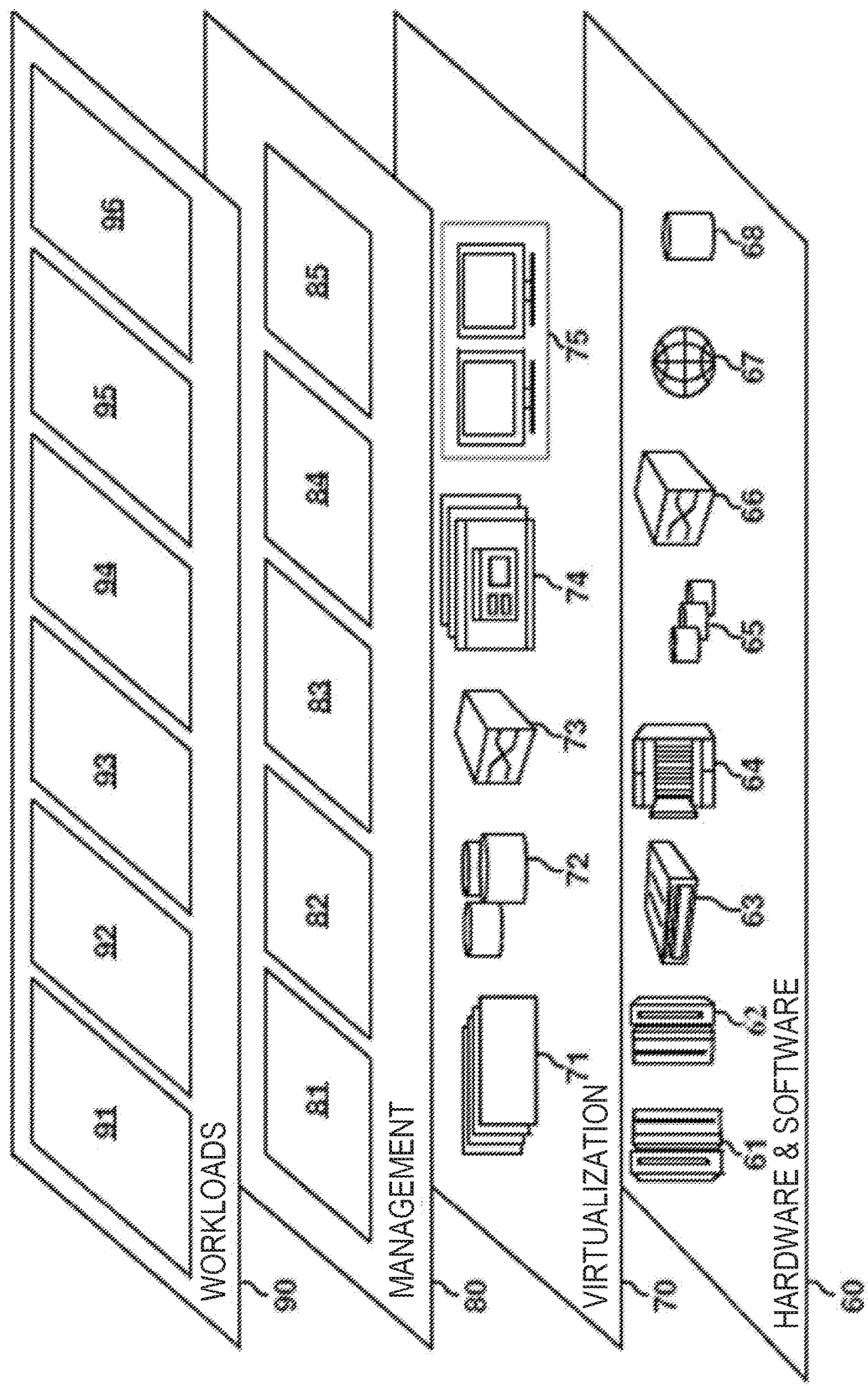
FIG. 2 is a pictorial diagram of an example of abstraction model layers according to one or more embodiments disclosed herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
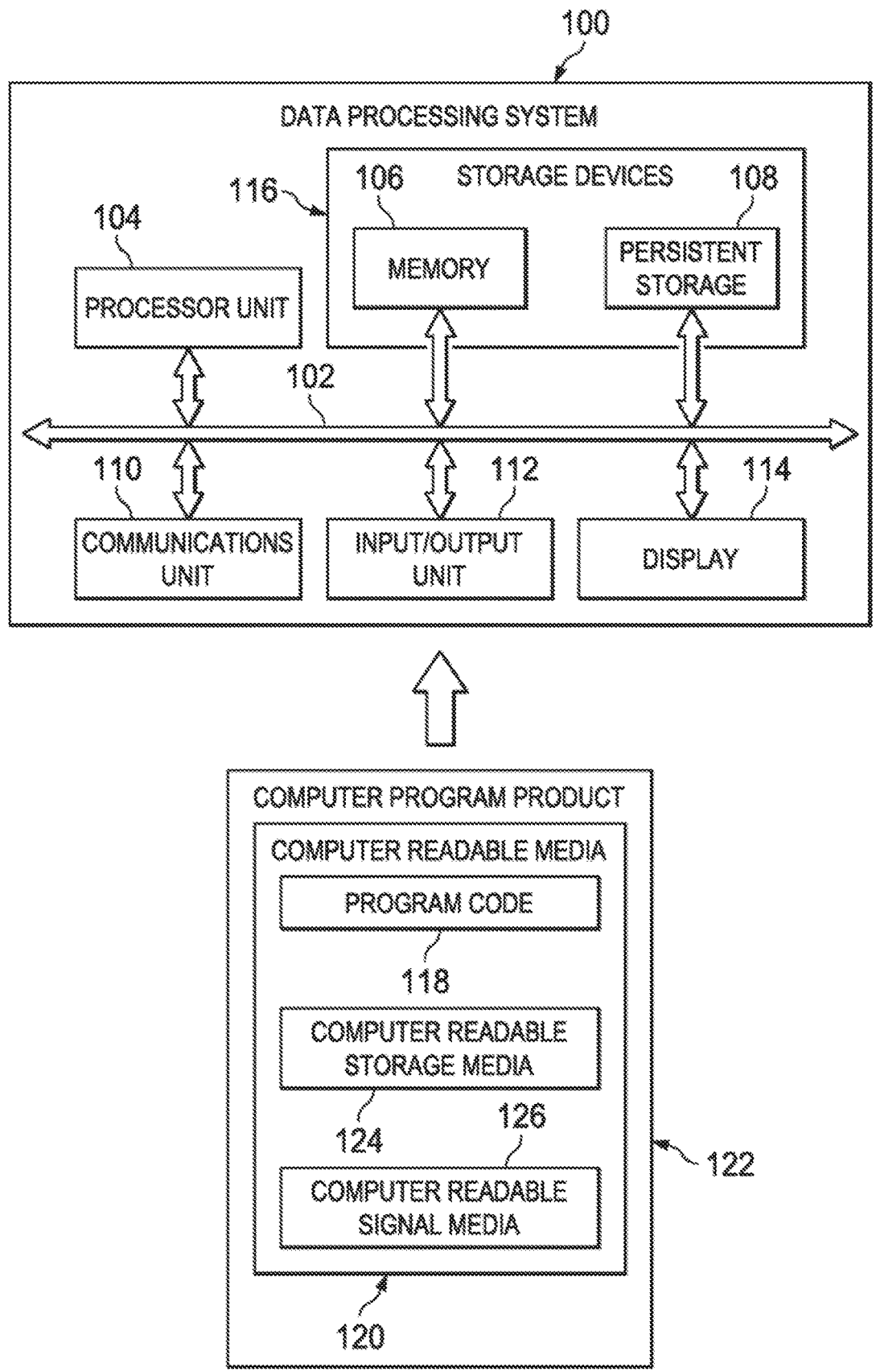
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-processor core, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100. In these illustrative examples, the computer readable storage media 124 is a non-transitory computer readable storage medium.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1 may be varied from the illustrative examples shown.

Figure 4:
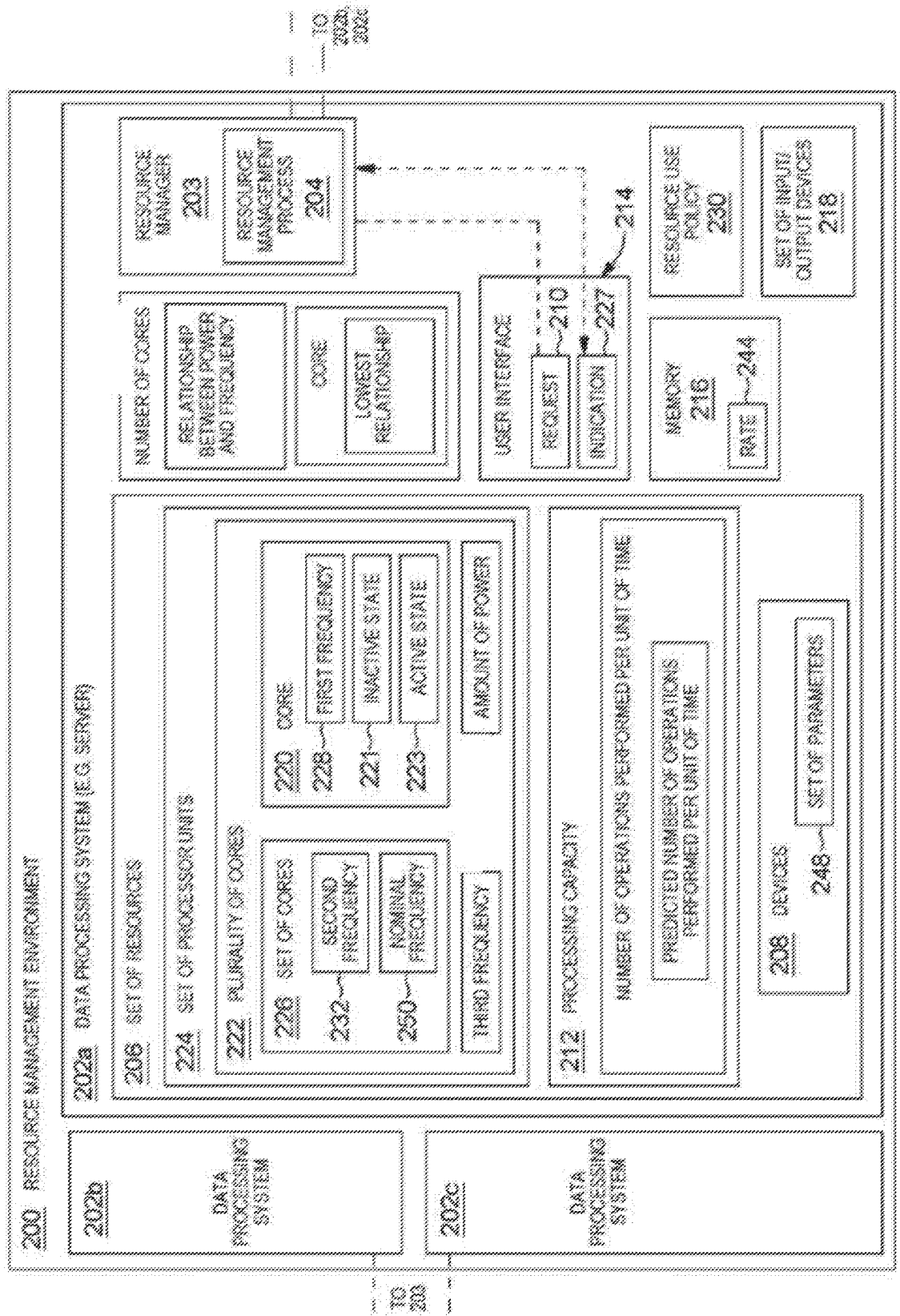
FIG. 4 is a block diagram of a resource management environment according to one or more embodiments disclosed herein.

With reference to FIG. 4, a block diagram of an example resource management environment is depicted according to one or more embodiments. A resource management environment 200 is an example of an environment in which illustrative embodiments may be implemented. The illustrative embodiment resource management environment 200 may be implemented, for example, in a server cluster that includes multiple DPSs 202a-202c (that collectively or by way of example may be referenced by reference number 202) that may be servers. The DPSs 202 may be examples of an implementation of the DPS 100. In the illustration, details are shown only for one of the DPS blocks, however other DPSs 202 may include similar architecture. Further, although only three DPS blocks 202 are shown in FIG. 3, in other examples, the resource management environment 200 may include any other number of DPSs.

Each of the DPSs 202 may include a resource manager 203 and set of resources 206. The resource manager 203 manages the use of the one or more resources 206. Further, the resource manager 203 may communicate with corresponding resource management modules of the other DPSs 202 in the resource management environment 200 to provide/receive additional computing resources 206 to or from the other DPSs 202. Although the resource manager 203 is illustrated as a single block in the figures, various parts of its functionality may be spread out over the entire resource management environment 200.

The set of resources 206 may refer to one or more computing resources in the DPS 202. For example, the set of resources 206 may include devices 208. The devices 208 may include any number of different devices that may include devices such as, for example, the processor unit 104, memory 106, persistent storage 108, communications unit 110, input/output (I/O) unit 112, and display 114. The devices 208 may also include devices that are external to DPS 202. For example, devices 208 may include devices connected to DPS, such as a camera or external storage device connected by a universal serial bus (USB) or other suitable connector.

Figure 5:
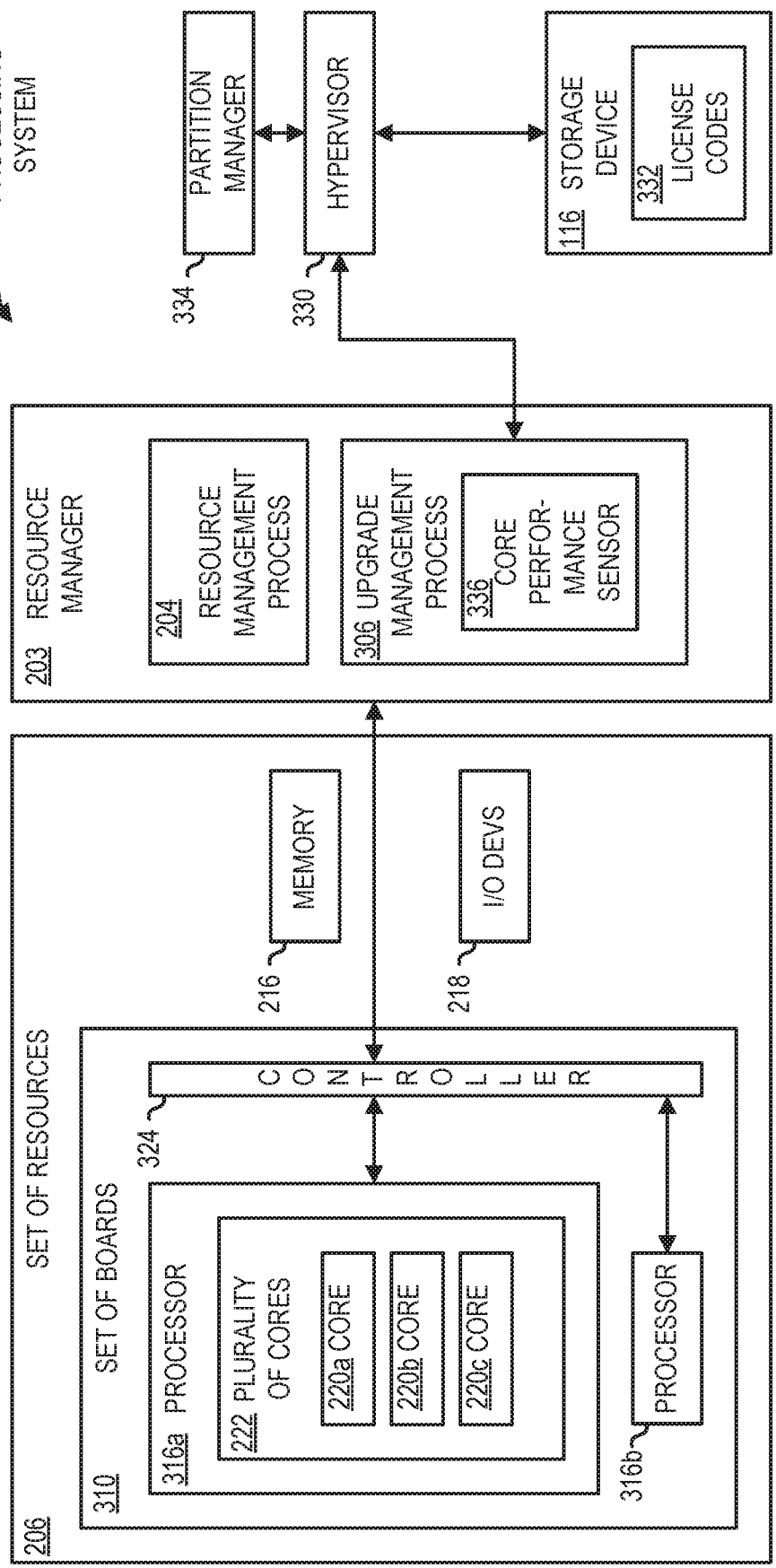
FIG. 5 is a block diagram of a resource management module in a DPS according to one or more embodiments disclosed herein.
Figure 6:
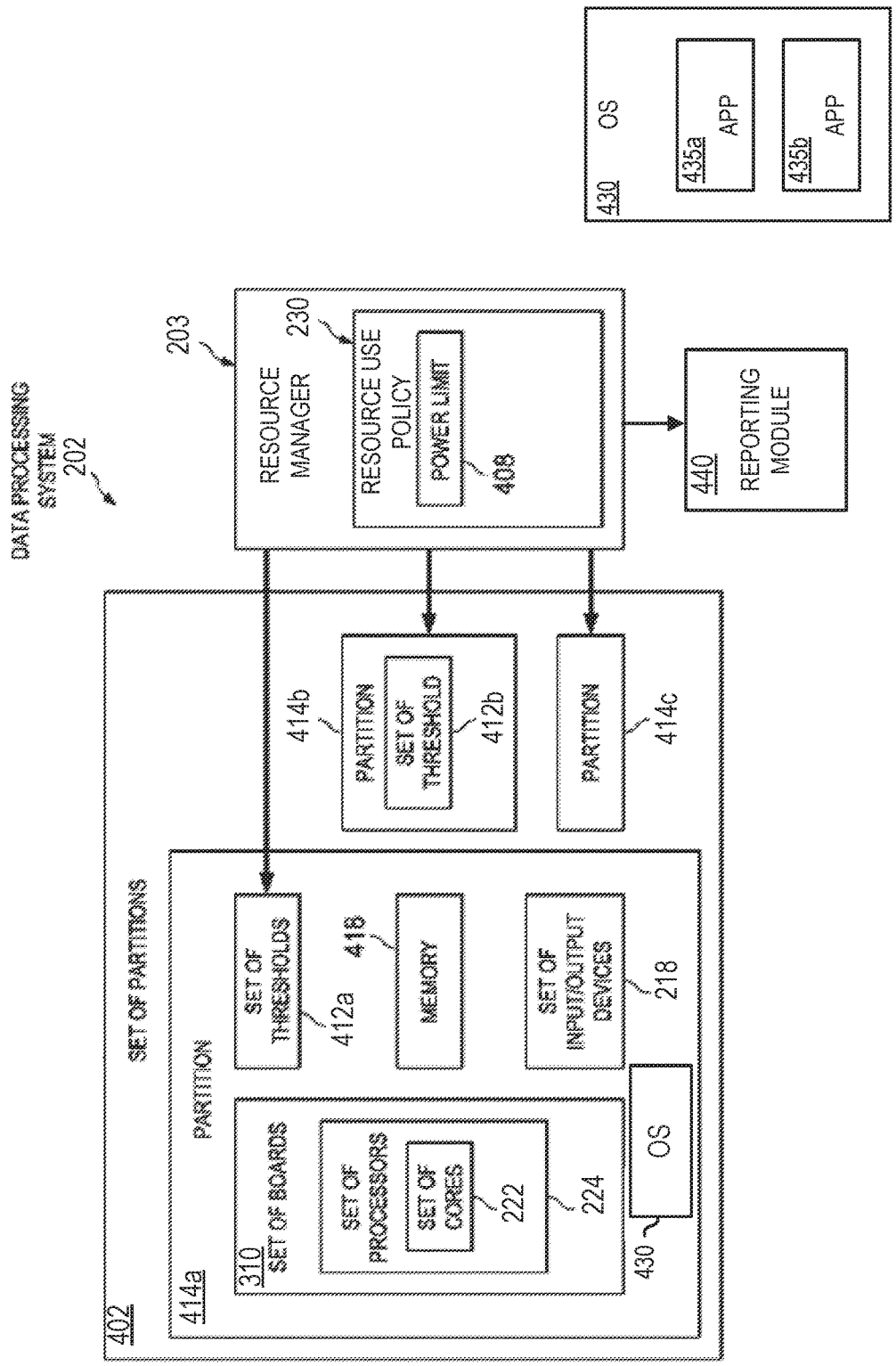
FIG. 6 is a block diagram of a set of partitions in a DPS according to one or more embodiments disclosed herein.

In various illustrative embodiments, a resource management process 204 may receive a request 210 for increased resources. The resource management process 204 may receive the request 210 from a user via a user interface 214, as show in FIG. 4. However, the resource management process 204 may also receive the request 210 from other entities that form a part of the resource management environment 200. Referring to FIG. 5, the request 210 may come from a hypervisor 330 that interacts with the resource manager. Referring to FIG. 6, the request 210 may also come from an operating system 430 of a partition 414a, or an application 435 running within that partition and utilizing the partition memory 418. Although not illustrated in the FIGs, in some embodiments, the request 210 may not technically involve an actual communication received by the resource manager 203, but may also be an "inferred request" based on logic contained within the resource manager 203 and access to information of various resources of the resource management environment 200 available to it. In other words, an "inferred request" may also be interpreted herein as the resource manager 203 making its own determination of some needed (but not explicitly requested) resource. Use of the term "the request" 210, as used herein, may include such an "inferred request", for the sake of simplicity. The inferred request may also be construed as an increase indication (i.e., an increase indication may be construed as making a determination of some needed resource that is not explicitly requested to increase processing capacity for the partition).

In these examples, the request 210 may be an increase request for an increase in capacity or performance in a set of resources 206. For example, the request 210 may be the request for CUoD. In one example, the request 210 is the request to increase processing capacity 212 of the set of resources 206. In another example, the request 210 is the request for an increase in memory 216 for the set of resources 206. In yet another illustrative example, the request 210 may be the request for an increase in a set of input/output devices 218 for the set of resources 206. Determining an increase may, in one implementation, be based on an increase request received by the resource manager 203. The request may originate from an operating system running in a partition and/or from an application running on the operating system within the partition.

When the resource management process 204 receives (or infers) the request 210 to increase the processing capacity 212 of a set of resources 206, the resource management process 204 may decide whether to activate an inactive core 220 of a plurality of cores 222 and approve the request 210. In these examples, the core 220 is a core in the plurality of cores 222 within in the set of processors 224. For example, the set of cores 226 in plurality of cores 222 are in an active state 223 in the set of processors 224. As used herein, "active" when referring to a core in a processor, means that the core is presently available to operate and execute instructions and perform operations for the processor. Core 220 may be inactive within set of processors 224. As used herein, "inactive" when referring to a core in a processor means that the core is not presently available to execute instructions and perform operations for the processor. For example, core 220 may be in an inactive state 221 or an active state 223. The inactive state 221 of the core 220 is when the core 220 is not presently available to execute instructions. For example, the core 220 may be in a sleep state while in the inactive state 221 in the set of processor units 224. Activating the core 220 to be in the active state 223 in the set of resources 206 may increase the processing capacity 212 of the set of resources 206. In an embodiment, an inactive core may also be a core that is not utilized during normal operations for a user, and represents latent processor capacity that is activated only under certain conditions. Thus, a processor in the inactive state represents latent CPU capacity (LCC) pre-existing within the set of processor units.

The resource management process 204 may determine whether the use of resource(s) for activating the core 220 meets one or more resource use policies or rules 230 in the DPS 202. For example, the one or more policies 230 may include an SLA, a power use policy that provides rules on the use of power in DPS 202, etc. For example, only a certain amount of processing power may be available for use in DPS 202. The one or more policies may also include rules regarding which users or client devices of the DPS may use certain resources in DPS 202 based on an SLA with the user.

If the resource management process 204 determines that the use of resources resulting from activating the core 220 at a first frequency 228 meets one or more policies 230, the resource management process 204 may activate the core 220 at the first frequency 228. For example, the resource management process 204 may activate the core 220 by establishing a first frequency 228 and scheduling instructions on the core 220. On the other hand, if one or more policies 230 is not being met, then the resource management process 204 may deny the request 210 to increase processing capacity 212. The resource management process 204 may provide an indication 227 that the request 210 to increase processing capacity 212 is unavailable. For example, the resource management process 204 may provide the indication 227 to a user via user interface 214, or some form of messaging or logging for an implied request.

In these examples, a minimum operating frequency may be the lowest frequency that the core may operate at. The minimum frequency may be a physical property of the core, the result of its logical design, or due to another property of the system, such as the size of the buses interconnecting the various components of the system. No matter what the cause of the limitation, there may be a well-defined minimum operating frequency.

The resource management process 204 may then increase the first frequency 228 of the core 220. In these illustrative examples, the desired value for the first frequency 228 may be selected based on an amount of increase in processing capacity 212 for the set of resources 206. In this example, the core 220 and set of cores 226 may operate at the same frequency. However, this same frequency may be lower than a second frequency 232 of a set of cores 226 before activation of the core 220.

Although the above examples describe adjusting the resources in the form of adjusting a processor frequency, in other examples, different types of resources may be adjusted. For example, the request 210 may also be the request for an increase in memory 216 in the set of resources 206. For example, a user or other entity described above may the request additional memory in a capacity upgrade on demand. Alternatively, or in addition, the resource management process 204 may identify a rate 244 that data is written to and read from memory 216. The resource management process 204 may adjust the rate 244 by, e.g., throttling. Throttling is a process of inserting rest periods in operations performed on the memory 216. For example, for certain periods of time, the memory 216 may be inactive. The inactivity of memory 216 reduces the rate 244 that data is written to and read from the memory 216. In one or more examples, specialty computer resources previously reserved for specific functions may also be made available to the user for a limited period of time.

Further, in one or more examples, the request 210 may also be the request for an increase in a set of input/output devices 218 for the set of resources 206. For example, a user or other entity described above may the request additional input/output devices in a capacity upgrade on demand. The set of input/output devices 218 may include, for example, persistent storage and/or communications units such as the persistent storage 108 and the communications unit 110.

According to one or more embodiments described herein, the resource management process 204 may monitor set of resources 206 and manage the request 210. The resource management process 204 may monitor the use of resources 206 in the DPS 202 following the request 210 being granted. If the use of the resources 206 does not meet the SLA or other policies, the resource management process 204 may adjust the set of parameters 248 of devices 208 in the set of resources 206. For example, the resource management process 204 may adjust the transfer rate 244 for the memory 216. The resource management process 204 may adjust the second frequency 232 of the set of cores 226 or the voltage supplied to the set of cores 222. The adjustments to the frequency and the voltage may be referred to as scaling. The resource management process 204 may scale the frequency and the voltage to meet a power use policy 230. The resource management process 204 may also deactivate a core 220 so that it is in an inactive state 223, portions of the memory 216, and/or devices in the set of input/output devices 218.

In one illustrative example, the resource management process 204 may identify the number of cores 220 of the set of cores 226 that should be in the active state 223 in set of resources 206 to maintain processing capacity 212. The resource management process 204 may monitor the second frequency 232 that the set of cores 226 are operating at. The resource management process 204 may then compare this second frequency 232 with a nominal frequency 250 for the set of cores 226. The nominal frequency 250 is an expected frequency that the set of cores 226 may operate at without changes (reductions/increments) in frequency.

According to one or more embodiments, the set of resources 206 in the DPS 202 may be a partition within the DPS 202. For example, the set of resources 206 may be a physical partition with the devices 208 located within a common housing. The memory 216 and the set of input/output devices 218 may also be located within the common housing. In other illustrative embodiments, the set of processors 224, memory 216, and set of input/output devices 218 may all be part of a pool of resources that are interconnected via one or more communications unit and are located externally to one another. The resource management process 204 may allocate the devices 208 to form the set of resources 206. A given set of resources 206 may be used by one or more users at the same time.

In another example, the core 220 may not be part of the set of resources 206. All cores within the set of resources 206 may be operating when the resource management process 204 receives the request 210 to increase the processing capacity 212. The resource management process 204 may allocate the core 220 to the set or resources 206 from a different set of resources. In a similar manner, the memory 216 and the set of input/output devices 218 may also be allocated to the set of resources 206.

In yet another example, the request 210 may be a temporary request. The request 210 may be a request for increased capacity for only a period of time. After the period of time, the resource management process 204 may deactivate devices that were activated to grant the request 210. In other examples, the request 210 may be based a service billing metric or another policy-based criteria, other than using the amount of time as a metric.

FIG. 5 is a block diagram of an example DPS 202 that expands on the resource manager 203 according to one or more embodiments. The resource manager 203 may include the resource management process 204 and an upgrade management process 306. For example, the resource management process 204 may manage the use of the computing resources by devices in the DPS 202. The upgrade management process 306 may manage the request for an increased capacity such as the request 210, for example.

The DPS 202 may include the set of resources 206. The set of resources 206 may include the set of boards 310, memory 216, and set of input/output devices 218. The set of boards 310, memory 216, and set of input/output devices 218 are resources that may be in the set of resources 206 in these examples. The set of boards 310 may include a number of processors 316. For example, set of boards 310 may include processors 316a, b. In other examples, set of boards 310 may include any number of processors. In these examples, the set of boards 310 may be any surface for placement of and providing connections between components in a DPS. For example, without limitation, the set of boards 310 may be a printed circuit board, a motherboard, a breadboard and/or other suitable surfaces.

In one or more examples, the set of boards 310 may also include a controller 324 that controls the processors 316. For example, the controller 324 may activate a processor 316a or one of the cores 220a in the plurality of cores 222 inside of the processor 316a. The controller 324 may also control the frequency that each of the cores 220 in the plurality of cores 222 operate at. The controller 324 may also control the voltage applied to the cores 220 in the plurality of cores 222. The controller 324 may include hardware devices such as, for example without limitation, a microcontroller, a processor, voltage and frequency sensors, an oscillator and/or any other suitable devices. In other examples, the controller 324 may include program code for controlling processors 316.

The resource management process 204 and upgrade management process 306 communicate with the controller 324 to manage resources in the set of resources 206. For example, the resource manager 203 may receive the request to increase capacity in set of resources 206 via a request 210 from the user interface 214 or other elements discussed above. The request 210 may be the request to increase processing capacity by activating one or more cores 220 in plurality of cores 222. Some cores in the plurality of cores 222 may be in the inactive state 221. The set of resources 206 may be allowed to have a certain number of cores active. In other words, the set of resources may be licensed to use a certain number of cores 220 in the multiple cores 222. In one or more examples, the request 210 may include a license code. The license code may include an identifier of a core 220a and a key to activate the core 220a. The resource manager 203 may receive the license code and communicate with a hypervisor 330 to determine which cores are licensed among the multiple cores 222.

The hypervisor 330 is a module that may allow multiple operating systems to run on the DPS 202. The hypervisor 330 may compare the license code from the request with a set of license codes 332 stored in a storage device. In these examples, each core among the multiple cores 222 has a license code in set of license codes 332. If the license code from the request matches a license code in set of license codes 332, the hypervisor 330 determines which core in plurality of cores 222 corresponds to the license code matched in set of license codes 332. The core determined is core 220 to be licensed in set of resources 206. The hypervisor 330 communicates core 220 to be licensed in set of resources 206 to the resource manager 203. On the other hand, if the license code in the request does not match a license code in set of license codes 332, the request 210 may be denied. Under certain circumstances, described in more detail below, such license codes 332 do not have to be used in order to accept the request 210 or increase available resources.

Additionally, if the set of resources 206 is a partition within the DPS 202, the hypervisor 330 may communicate with a partition manager 334 to determine which resources are part of the partition 414 (FIG. 6). For example, the request 210 to increase the processing capacity (increased computing resources) may be the request to increase a capacity in a particular partition. The hypervisor 330 may confirm that the core 220a requested to be licensed among the multiple cores 222 is part of the partition 414. The partition manager 334 may maintain a listing of resources that are part of particular partitions 414. If the core 220a requested to be licensed is not part of the partition requesting the capacity increase, partition manager 334 may allocate the core 220a to the partition 414. Then, the hypervisor 330 may communicate the core 220a to be licensed in the set of resources 206 to the resource manager 203.

In these illustrative examples, the resource manager 203 may receive information identifying the core 220a to be licensed in the cores 222. The upgrade management process 306 may then send instructions to controller 324 to activate the core 220a to be licensed in the plurality of cores 222. In one or more examples, the upgrade management process 306 may include a core performance sensor 336. The core performance sensor 336 monitors performance of one or more cores from the cores 222. For example, core performance sensor 336 may monitor a frequency at which active cores among the multiple cores 222 operate. The upgrade management process 306 may activate core 220a to be at the same frequency the other active cores in plurality of cores 222, as previously discussed with regard to core 220 in FIG. 4. In other examples, the upgrade management process 306 may activate the core 220a at a first frequency and adjust the frequency to increase the processing capacity of plurality of cores 222 in set of resources 206.

The illustration of the resource manager 203 in the DPS 202 is not meant to imply physical or architectural limitations to the manner in which different features may be implemented. Other components in addition to and/or in place of the ones illustrated may be used. Also, the blocks are presented to illustrate some functional components. One or more of these blocks may be combined and/or divided into different blocks when implemented in different illustrative embodiments. This is true for any of the blocks illustrated in the FIGs, as would be understood by one of ordinary skill in the art.

For example, without limitation, in some illustrative embodiments the resource manager 203 may not be part of the DPS 202. The resource manager 203 may be located remotely from the DPS 202. For example, the resource management process 204 and the upgrade management process 306 may be running on a computing system located remotely from the DPS 202. The resource management process 204 and the upgrade management process 306 may communicate with other data processing elements to monitor and control the use of power in DPS 202.

In other illustrative embodiments, the set of resources 206 may include any number of boards as a set of boards 310. Each board in the set of resources 206 may have a separate controller, such as a controller 324, for example. The controller 324 may also control processors on more than one board in the set of boards 310 of the set of resources 206. In some illustrative embodiments, sensors such as a core performance sensor 336 may be located on each board in the set of resources 206. In other examples, the set of resources 206 may include sensors for each resource. Sensors in the core performance sensor 336 may be part of individual processors in processor 316 as well as cores in the multiple cores 222.

FIG. 6 is a block diagram illustrating an example of a set of partitions 402 a DPS 202, in accordance with an illustrative embodiment. The DPS 202 includes a set of partitions 402. In the illustrated example, the resource manager 203 may include a resource use policy 230 for a set of partitions 402 in the DPS 202. The resource use policy 230 may incorporate a policy or a set of rules that specify the use of computing resources in the DPS 202. For example, the resource use policy 230 may include resource limit(s) 408. The resource limit 408 may be a limitation on an amount of computing resource that is available for use in the DPS 202. The resource limit 408 may also be a limitation on the amount of power that may be "consumed" or "used" by a partition 414a from the set of partitions 402. In one or more examples, the resource limit 408 may be based on an SLA associated with the partition, the SLA being setup with a user that is using the partition.

In these illustrative examples, the resource use policy 230 may include a set of thresholds 412 for the partition 414a. The set of thresholds 412 may include resource use thresholds for devices in the partition 414a. For example, the set of thresholds 412 may include resource use thresholds for each board from the set of boards 310, memory 216, and/or set of input/output devices 218. Thus, power use thresholds in the set of thresholds 412 may be specific to devices in the partition 414a. Similarly, each processor in the set of processors 224 and each core in set of cores 424 may have thresholds in set of thresholds 412 for the use of power.

The resource manager 203 may monitor computing resource use by devices in the partition 414a. The resource manager 203 may determine whether the use of the computing resources by the devices in the partition 414a is within thresholds in set of thresholds 412. If the use of computing resources is not within the thresholds, the resource manager 203 may determine that the use of the computing resources does not meet resource use policy 230.

The resource manager 203 may also monitor computing resource used in the partitions 414b and 414c. For example, the resource use policy 230 may include a set of thresholds 414b for the use of computing resources by devices in the partition 414b. Set of thresholds 412b may limit the use of computing resources in the partition 414b. For example, the resource manager 203 may receive the request 210 to increase a capacity in the partition 414b. The resource manager 203 may grant the request of the use of computing resources resulting from granting the request if it is within the set of thresholds 412b and meets resource use policy 230. The set of thresholds 412b for the partition 414b may ensure that increases in the use of computing resources by devices in the partition 414b do not, for example, exceed the contractual values per the SLA. Thus, the resource manager 203 may not grant the requests to increase capacity in one partition when the request causes capacity to exceed the SLA values.

The resource manager 203 may allocate resources 206 from another DPS 202 in the resource management environment 200. For instance, in a case where one of the processors 224 of a first DPS is being used for an internal event of the first DPS 202 or a situation outside of normal operation, which may include a diagnostic event, an initial program load, capturing a trace, or any other such computationally intensive operation, the resource manager 203 may allocate one of the processors 224 from a second DPS 202 to handle one or more operations/workload in the first DPS 202. In a similar manner, any other type of resources 206 of the second DPS 202 may be allocated to perform a task/operation of the first DPS 202 if any of the computing resources 206 of the first DPS 202 are being used for an abnormal event.

In one or more examples, a reporting module 440 receives a computing resource usage by each of the partitions in the set of partitions 402. The reporting module 440 may generate, automatically, a bill for the one or more respective users (client devices) according to the computing resources used by the corresponding partitions. For example, the reporting module 440 may receive a duration for which a particular computing resource has been used by the partition 414. The reporting module 440 may use the SLA for the user who is using the partition 414 to determine rates for one or more of the computing resources used by the partition 414 and may calculate the bill amount for the user according to the SLA.

The illustration of the set of partitions 402 in the DPS 202 is not meant to imply physical or architectural limitations to the manner in which different features may be implemented. Other components in addition to and/or in place of the ones illustrated may be used.

In case of an abnormal event, the one or more computing resources may be used to address the abnormal event. Such use of the computing resources does not have to be billed to the user, because addressing the abnormal event may be considered an internal event for the DPS 202. Further, the abnormal event may cause the user to have an outage of service provided by the user. For example, the user may be a cloud service provider such as social network providers (e.g., FaceBook™), e-commerce providers (e.g., Amazon™), financial institutions (e.g., banks), health service providers (e.g., doctors, hospitals, insurance providers) and the like, where even the smallest of outages may have major consequences. As described herein, in one or more examples, the cloud outages and other abnormal events may be the result of failures in the infrastructure of the DPS 202. Alternatively, or in addition, failures may be caused by a workload provided by the cloud service provider, or an end-user of the cloud service provider. Regardless of the source of the outage or abnormal event, it is important to get the systems executing on the DPS 202 operating in normal running conditions as fast as possible.

Typically, diagnosing a failure condition requires resource intensive diagnostics. For example, additional processor resources may be consumed when failure diagnosis requires the creation of detailed trace records and additional data logging. Some hardware features, such as a branch trace of one or more processors may introduce a significant processor overhead. Further, debugging of stack overlays on processors, such as x86 architecture, may require an additional processor to check pointers and control stack placement. In one or more examples, abnormal events causing a failure condition that require computing-resource-intense traces or diagnostics may occur in the partition 414 while other partitions continue normal processing, without failure conditions.

In one or more examples, to handle such outages, clustered computing is a common technique to provide HA processing. In a HA system, multiple machines are setup, each capable of running the workloads. In one or more examples, the workload may be split and executed concurrently on multiple machines in the cluster. When one machine in the cluster experiences an outage, or failure condition, additional processors from a second machine in the cluster may provide support for diagnosis of the outage. Alternatively, or in addition, the second machine in the cluster may absorb additional workload that was being operated by the first machine with the failure. In such cases, the additional load on the fallback system, the second machine in this case, is higher than the steady state load as the second machine. Further yet, the second machine may have to perform extra operations to complete any backlog workloads that accrued while the primary system, the first machine with failure, was out. This fallback operation may be planned or unplanned.

Thus, resolving the failure condition may be computing resource intensive. For example, resolving the failure condition may include performing a trace operation to capture a system dump and diagnosing the DPS 202 using the data in the captured system dump. Further, the resolution may include restarting the operating system in the partition 414, which may include an IPL (booting). The IPL may be a computationally intensive process. Such uses of the computing resources may affect the SLA with the user because the user does not receive a level of performance that may be contracted in the SLA.

Additionally or alternatively, in one or more examples, moving workloads from one DPS to another DPS may be mandatory. For example, the United States government has regulations that require the banking industry and other sensitive industries to perform periodic movement of processing between two or more DPSs to demonstrate compliance. Such movement of workloads causes the DPSs to perform IPLs.

Such failure condition resolutions and IPLs cause a technical problem of slowing the operation of the DPSs. Further, the technical problems may include using computing resources for operations other than a normal workload from user. Instead, the computing resources may be used for internal data processing operations that are invisible to the user.

Thus, one or more embodiments may address such technical problems by detecting an abnormal event that takes away processing capacity from a processor or from one or more processors in a cluster and provide additional CPU or other resources under these conditions. According to one or more embodiments, when a DPS detects an IPL/boot in one hypervisor (or partition), the DPS may work with the one or more hypervisors to increase the processing capacity of the processors used by the booting system or partition. The increase may be performed without a corresponding billing or accounting to the user for such an increase in resources. Although the DPS may detect the IPL/boot, a hypervisor may also, in an embodiment, report the IPL to the DPS for handling, or may report the request for additional resources via the request 210. Similarly, an OS or application within the partition may make a similar request.

The duration of the capacity increase may be a predefined wall clock (i.e., world) time, a predefined number of processor cycles, or a predefined event. The duration may be governed by a set of predefined rules that take into account any of these or other criteria as well. The term "predefined" used in this context means defined by any entity in advance of the occurrence of the abnormal event.

The improved performance may be targeted to support a boot/IPL/recovery of a partition (virtual machine) while maintaining steady performance for other partitions (virtual machines) that are not currently going through boot/IPL/recovery. One or more embodiments may be applied to bare metal machines and to various levels of hypervisors including level 1 and level 2 hypervisors.

"Bare metal" machines typically host a single operating system or hypervisor, and may include the capability to boost the boot/IPL/recovery time of the operating system running on the bare metal. A first level hypervisor runs on a bare metal machine and simulate many machines, each of which may host a single operating system or hypervisor. First level hypervisors can work with the bare metal machine to provide the capability to boost the boot/IPL/recovery time of one or more of the operating systems running under the first level hypervisor. An LPAR on the IBM z14® is an example of a first level hypervisor. Second level hypervisors are hypervisors hosted by a first level hypervisor. Second level hypervisors can also simulate machine machines which can each run a single operating system or hypervisor. Second level hypervisors can work with first level hypervisors and with the bare metal machine to provide the capability to boost the boot/IPL/recovery time of one or more of the operating systems running under the second level hypervisor. zVM® running under LPAR on an IBM z14® is an example of a second level hypervisor. zVM running under a zVM that is running under LPAR on an IBM z14® is an example of a third level hypervisor. The chain of hypervisors under hypervisors can continue indefinitely. Each of these hypervisors can boost the boot/IPL/recovery times for their hosted operating systems. The mechanisms to grant and isolate the performance boost may be slightly different at each level of hypervisor while the basic concept and value proposition remain the same.

The increased performance may be used in at least two ways in the DPS 202. First, the increase in the computing resources may shorten the boot/IPL/recovery process. Second, the increase in the computing resources may provide additional processing capacity following completion of the boot/IPL/recovery process that may be used to complete a workload backlog. The increased computing resources may facilitate an increased performance capacity of the DPS 202 that may be used to make completing the workload backlog faster once the boot completes.

In one or more examples, the increased performance obtained by allocating computing resources from a second DPS 202 may facilitate bringing the first DPS 202 to full capacity while one or more members of the server cluster (i.e., the resource management environment 200) have additional processing costs due to the abnormal event(s). In one or more examples, the second DPS 202 may grant additional computing resources to the first DPS 202 (or any other DPS), where both DPSs are part of the same server cluster. Alternatively, or in addition, in one or more examples, the second DPS 202 may provide additional computing resources to offset the processing costs of a DPS 202 that is part of a second server cluster (resource management environment 200). In one or more examples, using the computing resources 206 from a second server cluster may offset processing costs that are expended to complete abnormal events, and resolving the abnormal events, for example, diagnostic events such as traces.

The processors 224 may provide different cost/performance trade-offs. For example, processors, such as the IBM z14, offer 26 distinct capacity levels; thus, a DPS with six sets of processors may offer a total of 156 capacity settings (26×6). In one or more examples, the processors 224 may operate at an artificially reduced capacity level during steady state operation of the partitions 402. The capacity level may be increased by instructing the processors 224 to use additional computing resources, changing the frequency at which they processors 224 operate, and the like. Additionally, or alternately, the capacity level may be increased by activating one or more cores 220 that are in an inactive state 221. It should be noted that the processors 224 may be any other processor type than the above example, such as ARM™ processors, X86-architecture-based processors, and others.

A determination as to whether to increase processor resources by increasing the processor speed, adding inactive cores, or both may be determined by the resource manager 203. Most partitions and/or activities within the partition are robust in benefitting from an increase in the processor speed. However, not all partitions or activities within the partition can benefit from the introduction of additional active cores. Thus, the resource manager 203 may comprise a database that may help it determine which approach(es) are most likely to be beneficial when boosting resources, and may further comprise rules that help govern the extent of resources to add under various situations. In an embodiment, the hypervisor may determine that activating a second core is beneficial to addressing the abnormal event when it is determined that a partition and/or the operating running therein may run with a plurality of threads that may each run on a separate core.

Additionally, the abnormal event may be comprised of abnormal event stages and/or abnormal event sub-events, and different amounts of resources may be added dependent upon these stages/sub-events. The amount of resources to add in a given situation may be stored in a table or database and may be dependent upon various characteristics of the actual hardware available, the type of abnormal event, an amount of unused resources. The amount of resources to add may further be based on calculated formulaic values that utilized, among other things, the predefined stored values. When applying resources in a form of activating inactive processors, in one implementation, such additions and removals may be combined with modifications to the processor speeds as well—in such a combination, smooth transitions in system processing power may be perceived by an end user, as opposed to abrupt changes that might otherwise occur.

In addition, a logging/tracking/audit (LTA) procedure may be utilized to help assess system performance when increased resources are utilized in the system. The LTA procedure may include timing information of relevant time durations. The timing information may be comprised of start and end dates and times for these durations, such as abnormal event durations and additional resource processing durations. The LTA procedure may capture such timing information for a duration of the abnormal event and the increased processing. The LTA procedure may also comprise information as to an amount of resources provided for the duration of the increased processing or at various stages of the increased processing, the system response times before, during, and after the increased processing, and other related data. Information about the involved partitions as well as process running within the partitions or external to the partitions may be included as well. Reviewing and analyzing the LTA data may allow various parameters regarding the extent resources to apply to be adjusted.

In a multi-partition system, it may be possible for two or more partitions to simultaneously experience abnormal events or to have an occurrence of their respective abnormal events overlap in time. The respective first and second partitions may benefit from a simultaneous or overlapping application of additional resources to deal with them. In such a situation, determining how to allocate available resources may be determined in a manner similar to the manner in which resources are provided to a single partition, as described above (tables, formulaic calculations, etc.). In one embodiment, it is possible that all (or a maximum number/amount of) available resources be given to a higher-priority abnormal event partition until the handling of the abnormal event is complete, after which all available resources are given to the lower-priority event. In another embodiment, the available resources could be split among them. In another embodiment, a "first abnormal event" to occur may get priority over available resources, or possibly get priority only if a later occurring abnormal event is of a same or lower priority than the earlier occurring abnormal event.

Figure 7:
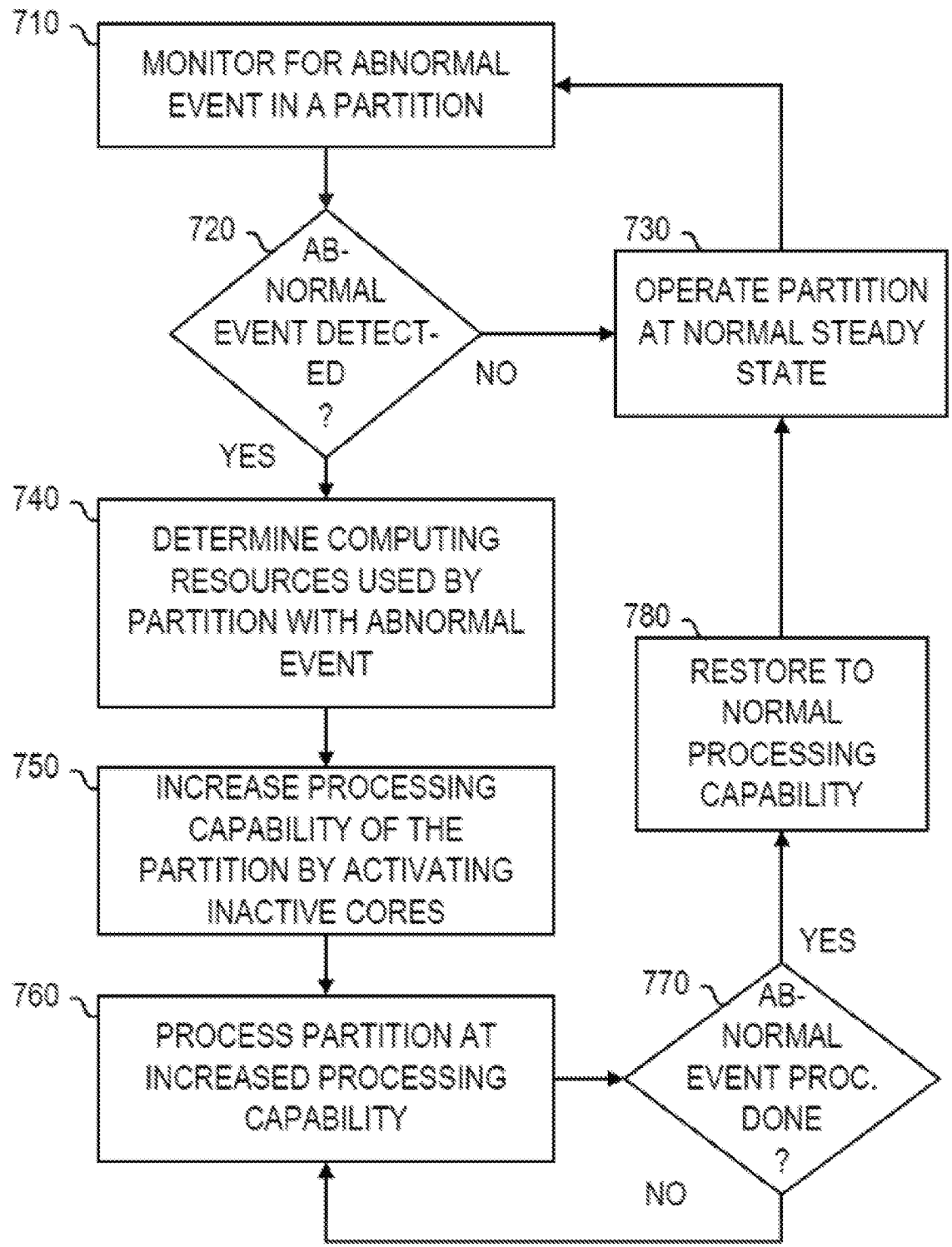
FIG. 7 is a flowchart of an example method for increasing processing capacity of processor cores during specific event processing according to one or more embodiments disclosed herein.

FIG. 7 is a flowchart of an example process 700 of increasing processing capacity of processor cores 220 during specific event processing according to one or more embodiments. The process 700 may include, in operation 710, monitoring for an abnormal event at a partition 414 from the set of partitions 402 in the DPS 202. In one or more examples, the hypervisor 330 or the partition manager 334 may monitor the performance of the partitions for the abnormal event. The abnormal event in the partition 414 may be detected by monitoring an output level of the partition 414, where the abnormal event is a condition that adversely affects the ability of the partition 414 to deliver expected levels of output. The abnormal event may further include an IPL of an operating system 430 of the partition 414. In one or more examples, the operating system 430 is in a cloud or a hyperscale environment.

Until an abnormal event is detected at operation 720, (operation 720: NO) the partition 414 may continue to operate, at operation 730 using the allotted computing resources 206. The allotted computing resources 206 may be based on the SLA with the user/client using the partition 414. This is referred to as a "steady state" or "normal operation" of the partition 414, when the partition is operating using the default computing resource settings according to the SLA.

If an abnormal event is detected (720: YES), the computing resources 206 being used by the partition 414 may be identified, at operation 740. Further, at operation 750, the resource manager 203 may increase the processing capacity of the partition 414 by increasing the computing resources 206 allotted to the partition 414, such as by increasing core speed, activating inactive cores 220, and using other techniques discussed above. The additional computing resources that are provided may be from the first DPS 202, the second DPS 202, or any other DPS 202.

For example, the additional resource added may include additional processing capacity which may be delivered by increasing the number of cores 222 allocated for the partition 414, which may involve bringing cores 220 that may be in an inactive state 221 into an active state 223. Alternatively, or in addition, the processing capacity may be increased by increasing the processing capacity per core 222. For example, the operation of the processors 224 may be adjusted using On/Off CoD to enable and disable hardware engines of the processors 224. Alternatively, or in addition, the processing capacity may be increased by changing a virtual machine priority on a virtualized system.

In one or more examples, the additional processing capacity of the partition 414 may be provided by increasing I/O devices 218, increasing memory 216, or other such computing resources 206 allocated to the partition 414. Alternatively, or in addition, the additional capacity may be delivered by moving the operating system image of the partition 414 using live guest relocation techniques to another DPS 202 that may deliver additional capacity with the intent of partially or fully offsetting the performance impact of the abnormal event. In this case, the other DPS 202 to which the partition 414 is moved may be referred to as a backup DPS 202. In one or more examples, the resource manager 203 of the backup DPS 202 may allocate one or more computing resources 206 to the relocated partition 414 from a third DPS 202. As described herein, the computing resources allocated to the partition 414 may be further configured dynamically, such as using CoD or other techniques.

The additional processing capacity may be provided by the resource manager 203. In one or more examples, the partition 414 indicates the type of abnormal event, and in response, the processing capacity is increased by providing the one or more additional computing resources 206 as described herein.

Once the additional processing capacity is provided, at operation 760, the processing of the partition at the increased processing capability continues. A determination may be made, at operation 770, as to whether the abnormal event processing has completed. This may be done based on any of the criteria discussed above. If the abnormal event processing is not complete (770: NO), then the increased processing capability continues at operation 760. Otherwise (770: YES), the processing for the operation of the partition 414 completes and the operation is restored, at operation 780, to normal processing capability and operation of the partition at a normal stead state continues at operation 730. Resolving the abnormal event may include operations that are performed after completion of the abnormal event. For example, in the case where the abnormal event is an IPL, the additional computing resources 206 may facilitate the partition 414 in completing the IPL in a shortened amount of time as compared to an IPL with the steady state computing resources.

Further, in one or more examples, the additional computing resources are used by the partition for resolving the abnormal event. Resolving the abnormal event may include performing one or more follow up operations, such as to determine a cause of the abnormal event. For example, in case the abnormal event is an IPL caused by an unplanned system shutdown, the resolution may include performing a system diagnostic, trace, and other types of analysis to determine the cause of the abnormal event. Because such operations for resolving the abnormal event may also be computationally intensive, the resource manager 203 may facilitate the additional computing resources to complete such diagnostic or analytical operations.

The process 700 may be designed to operate continuously. Restoring the computing resources of the partition 414 may include deallocating the additional computing resources that were allocated to the partition 414. Although the partition 414 is described above as an example partition to describe a process 700 that may be used, in other examples, a different partition from the set of partitions 402 may experience the abnormal event.

Figure 8:
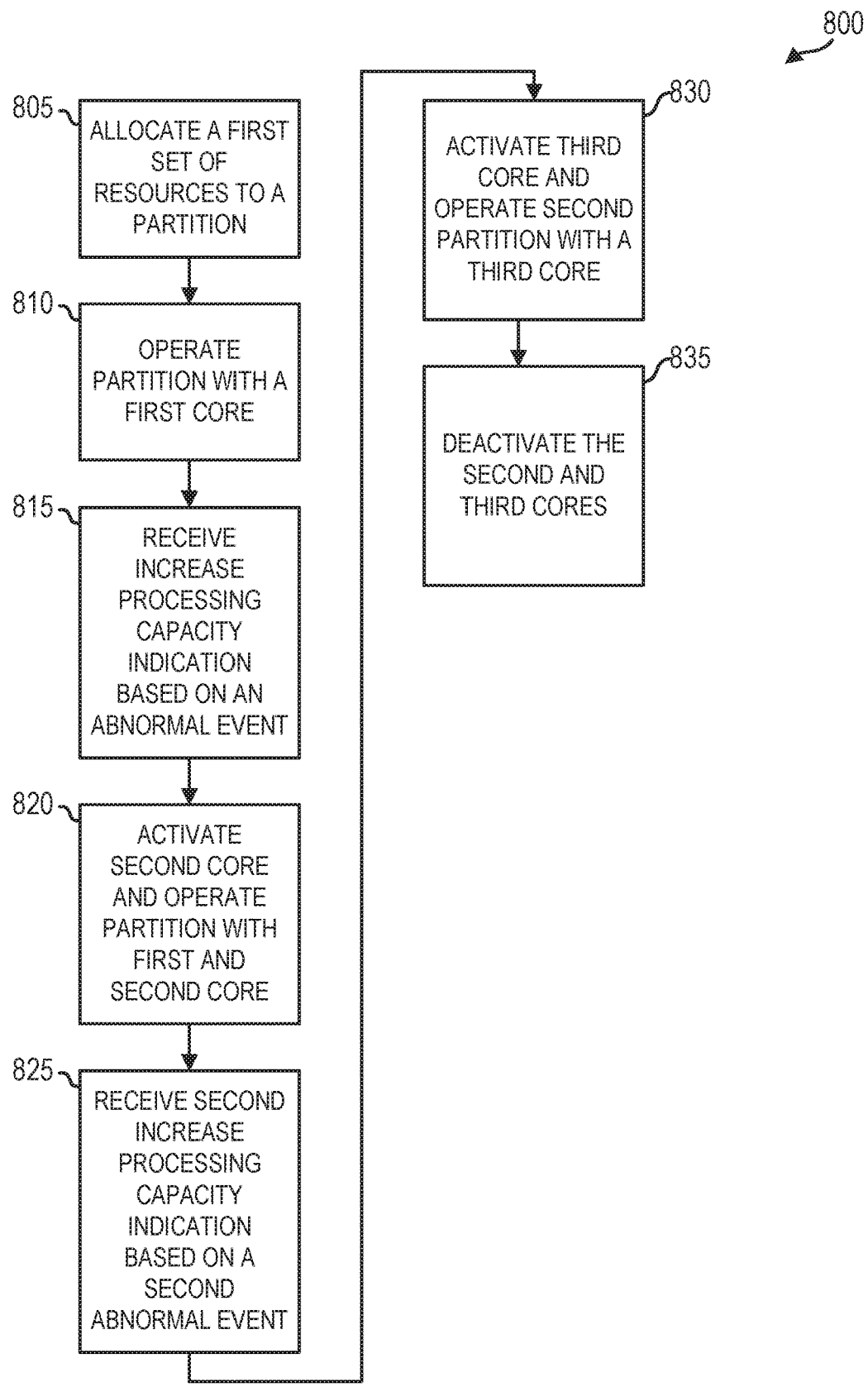
FIG. 8 is a flowchart of an example of another method for increasing processing capacity of processor cores during specific event processing according to one or more embodiments disclosed herein.

FIG. 8 is a flowchart of an example of another method for increasing processing capacity of processor cores during specific event processing according to one or more embodiments disclosed herein. The process 800 may start by, in operation 805, allocating, for a partition 414*a* that is hosted on the DPS 202, a first set of computing resources comprising a set of processor units 224, the set of processor units 224 comprising a first core 220*a* in an active state 223, and a second core 220*b* that is initially in an inactive state 221. The second core 220*b*, while in the inactive state 221, may represent LCC pre-existing within the set of processor units 224. When the system is running in a normal state or normal operating mode, in operation 810, the system is operated with the first core 220*a* but without the second core 220*b*. In operation 815, an indication of an abnormal event, such as an IPL, may be determined or received by the resource manager 203, indicating that the processing capacity of the partition 414*a* should be increased to deal with an increased processing load created by the abnormal event. In operation 820, the second core 220*b* is changed from the inactive state 221 to the active state 223, thereby providing processing power to the partition 414*a* using both the first 220*a* and second 220*b* cores.

In operation 825, an indication of a second abnormal event, such as an IPL, may be determined or received by the resource manager 203, indicating that the processing capacity of a second partition 414*b* should be increased to deal with an increased processing load created by the second abnormal event. In operation 830, a third core 220*c* associated with the second partition 414*b* is changed from the inactive state 221 to the active state 223, thereby providing additional processing power to the second partition 414*b*. In operation 835, once the abnormal event has concluded in the first partition 414*a*, or when a predefined or other criteria described above occurs, the second core 220*b* in the first partition 414*a* may be changed from an active state 223 to an inactive state 221. Similarly, once the abnormal event has concluded in the second partition 414*b*, or when a predefined or other criteria described above occurs, the third core 220*c* in the first partition 414*a* may be changed from an active state 223 to an inactive state 221.

One or more embodiments discussed herein accordingly provide a system where an abnormal event is detected and additional resources are provided based on detection of the event. The abnormal event is a condition that affects the ability of the DPS, particularly a partition of the DPS, to deliver expected levels of output, as per an SLA or other thresholds. The duration of the application of additional resources may extend past the duration of the event. For example, additional resources applied during an IPL (boot) may continue to be available for some period of time after the abnormal event, such as an IPL (boot).

According to one or more embodiments, a DPS, such as a computer server, may detect an abnormal event in a partition, and in response, provide additional computing resources to that partition. The desired level of output may include one or more thresholds, for example provided in an SLA.

In one or more examples, the abnormal event that is detected is the IPL (boot) of an operating system on either physical or virtual hardware. In one or more examples, the IPL (boot) of an operating system is in a cloud or hyperscale environment.

In one or more examples, the additional resource added is additional processing capacity which could be delivered via additional cores, by increasing the processing capacity per core (for example increase in capacity from a sub-capacity model to a full speed model), and/or by changing virtual machine priority on a virtualized system. The additional capacity added may include I/O devices, memory, or other hardware electronic circuitry being allocated for the partition 414 to use. In one or more examples, the additional capacity added is delivered by moving the operating system image of the affected partition to an environment that may deliver additional capacity with the intent of partially or fully offsetting the performance impact of an abnormal event.

The one or more embodiments disclosed herein accordingly provide an improvement to computer technology. For example, a cloud computing provider may use one or more embodiments to increase actual processing performance as seen by a virtual machine in a partition in a virtualized environment through tuning of hypervisor priorities. The virtual machine may handle various workloads and request additional computing resources that may be allocated not only from the computer server that hosts the virtual machine, but also from another computer server that may be part of a server cluster of the computer server. Further, in one or more examples, particularly for DPSs with multiple partitions, computing resources from a second partition may be allocated to the partition that is demanding higher computing resources. As described herein, the computing resources are allocated in response to detection of planned and/or unplanned event, such as boot/IPL/recovery time etc., which may be a major source of downtime for computer users. The one or more embodiments herein shorten such downtime because of boot/IPL/recovery time, or other events, thus improving the performance of the DPS.

In other examples, a database server such as Oracle Exadata™ may use the one or more embodiments to have workload continue processing without impact while running traces inside the database appliance. The database server may also provide additional processing capacity following a server outage to help a client recover from a workload outage by allocating additional computing resources to resolve the workload outage.

The flowchart and block diagrams in the FIGs illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Disclosed embodiments herein may include a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, ROM, an EPROM or Flash memory, an SRAM, a CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, ISA instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an ISP). In some embodiments, electronic circuitry including, for example, programmable logic circuitry, FPGAs, or PLAs may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for increasing processing capacity of virtual machines for an abnormal event, the method comprising, using a processor:
   providing, within a data processing system (DPS), a first set of computing resources comprising a set of processor units, the set of processor units comprising one or more first cores in an active state, and one or more second cores that are initially in an inactive state, wherein the one or more second cores, while in the inactive state, represents latent CPU capacity (LCC) pre-existing within the set of processor units;
   allocating, for a partition that is hosted on the DPS, the first set of computing resources comprising the set of processor units with the one or more first cores in an active state;
   operating the partition using the one or more first cores before the one or more second cores have been activated;
   determining, by a resource manager, to increase processing capacity for the partition utilizing the LCC based on an occurrence of an abnormal event;
   detecting the abnormal event by an operating system or application within the partition, and wherein:
   the determination of the increase is based on an increase request that is requested by the operating system or the application of the partition that detects the abnormal event; and
   wherein the abnormal event occurs within the partition that detected it;
   in response to the determining of the increase, activating the one or more second cores from the inactive state to the active state;
   operating the partition using both the one or more first cores and the one or more second cores after the one or more second cores has been activated; and
   in response to a predefined criterion, deactivating the one or more second cores from the active state to the inactive state.

2. The method of claim 1, wherein the one or more second cores are a part of the DPS that is hosting the partition.

3. The method of claim 1, wherein the determining of the increase is based on an increase request received by the resource manager.

4. The method of claim 1, wherein the abnormal event is an initial program load of an operating system instance executing in the partition.

5. The method of claim 1, wherein the predefined criterion is a completion of the abnormal event.

6. The method of claim 1, wherein the predefined criterion is at least one of a predefined duration since activating the one or more second cores and a use of a predefined amount of processor power.

7. The method of claim 1, further comprising determining a number of additional inactive cores to activate for the partition based on at least one of a predefined or detected load requirement of the abnormal event.

8. The method of claim 1, further comprising determining, by the resource manager, a number of the one or more second cores to activate for the partition based on historical data associated with the partition.

9. The method of claim 8, wherein the resource manager includes a hypervisor that oversees creation, termination, and operation of the partition.

10. The method of claim 1, further comprising determining by a hypervisor when an activation of the one or more second cores are beneficial to addressing the abnormal event.

11. The method of claim 1, further comprising:
   determining, by the resource manager, to increase processing capacity for a second partition utilizing the LCC based on an occurrence of a second abnormal event that overlaps in time with an addition of computing resources to the partition;
   in response to the determining of the increase for the second partition, providing further resources to the second partition selected from the group consisting of: a) increasing resources provided by the one or more second cores that are activated, or b) allocating one or more third cores to the second partition;
   operating the second partition using the one or more third cores in the second partition temporally overlapping with at least one of the one or more first cores or the one or more second cores in the first partition after the one or more third cores have been activated; and
   in response to a second predefined criterion, removing the further resources previously provided to the second partition selected from the group consisting of: a) decreasing resources provided by the one or more second cores that are activated, or b) deallocating the one or more third cores from the second partition.

12. The method of claim 11, wherein:
- the allocating of the one or more third cores comprises activating one or more third cores from the inactive state to the active state; and
- the deallocating of the one or more third cores comprises deactivating the one or more third cores from the active state to the inactive state.

13. The method of claim 11, wherein:
- the allocating of the one or more third cores comprises partially or completely reassigning one or more of the second cores from the first partition to the second partition; and
- the deallocating of the one or more third cores comprises unassigning the one or more third cores from the second partition.

14. A computer-implemented method for increasing processing capacity of virtual machines for an abnormal event, the method comprising, using a processor:
- providing, within a data processing system (DPS), a first set of computing resources comprising a set of processor units, the set of processor units comprising one or more first cores in an active state, and one or more second cores that are initially in an inactive state, wherein the one or more second cores, while in the inactive state, represents latent CPU capacity (LCC) pre-existing within the set of processor units;
- allocating, for a partition that is hosted on the DPS, the first set of computing resources comprising the set of processor units with the one or more first cores in an active state;
- operating the partition using the one or more first cores before the one or more second cores have been activated;
- determining, by a resource manager, to increase processing capacity for the partition utilizing the LCC based on an occurrence of an abnormal event;
- in response to the determining of the increase, activating the one or more second cores from the inactive state to the active state;
- operating the partition using both the one or more first cores and the one or more second cores after the one or more second cores has been activated;
- in response to a predefined criteria, deactivating the one or more second cores from the active state to the inactive state; and
- performing at least one of logging, tracking, or auditing information related to activation and deactivation of the one or more second cores.

15. A computer-implemented method for measuring and reporting increased processing capacity of virtual machines triggered by an abnormal event, the method comprising, using a processor:
- determining that additional resources have been applied to a partition to increase processing capacity for the partition triggered by an occurrence of an abnormal event;
- determining an extent and duration of the application of the additional resources; and
- performing at least one of logging, tracking, or auditing information related to activation and deactivation of the additional resources.

16. A computer system for increasing processing capacity of virtual machines for an abnormal event, the computer system comprising a processor configured to execute instructions that, when executed on the processor, cause the processor to:
- provide, within a data processing system (DPS), a first set of computing resources comprising a set of processor units, the set of processor units comprising one or more first cores in an active state, and one or more second cores that are initially in an inactive state, wherein the one or more second cores, while in the inactive state, represents latent CPU capacity (LCC) pre-existing within the set of processor units;
- allocate, for a partition that is hosted on the DPS, the first set of computing resources comprising the set of processor units with the one or more first cores in an active state;
- operate the partition using the one or more first cores before the one or more second cores have been activated;
- determine, by a resource manager, to increase processing capacity for the partition utilizing the LCC based on an occurrence of an abnormal event;
- in response to the determination of the increase, activate the one or more second cores from the inactive state to the active state;
- operate the partition using both the one or more first cores and the one or more second cores after the one or more second cores has been activated;
- in response to a predefined criterion, deactivate the one or more second cores from the active state to the inactive state; and
- perform logging related to activation and deactivation of the second core.

17. The system of claim 16, wherein:
- the abnormal event is an initial program load of an operating system instance executing in the partition;
- the predefined criterion is at least one of a completion of the abnormal event, a predefined duration since activating the second core, and a use of a predefined amount of processor power;
- the resource manager includes a hypervisor that oversees creation, termination, and operation of the partition; and
- the instructions further cause the processor to determine by the hypervisor when an activation of the second core is beneficial to addressing the abnormal event.

18. A computer program product comprising a computer-readable storage medium having computer-readable program code embodied therewith, to, when executed on a processor:
- allocate, for a partition that is hosted on a data processing system (DPS), a first set of computing resources comprising a set of processor units, the set of processor units comprising a first core in an active state, and a second core that is initially in an inactive state, wherein the second core, while in the inactive state, represents latent CPU capacity (LCC) pre-existing within the set of processor units;
- operate the partition using the first core before the second core has been activated;
- receive, by a resource manager, an increase indication to increase processing capacity for the partition utilizing the LCC based on an occurrence of an abnormal event;
- detect the abnormal event by a hypervisor that oversees creation, termination, and operation of the partition, and wherein the increase indication is responsive to the hypervisor detecting the abnormal event;
- in response to the increase indication, activate the second core from the inactive state to the active state;
- operate the partition using both the first and second core after the second core has been activated; and in response to a predefined criteria, deactivate the second core from the active state to the inactive state.

19. The computer program product of claim 18, wherein the program code embodied therewith is further configured to determine by a hypervisor when an activation of the second core is beneficial to addressing the abnormal event.

20. The computer program product of claim 18, wherein the program code embodied therewith is further configured to:
receive, by a resource manager, an increase indication to increase processing capacity for the partition utilizing the LCC based on an occurrence of an abnormal event;
in response to the increase request, activate the second core from the inactive state to the active state;
receive, by the resource manager, a second increase indication to increase processing capacity for a second partition utilizing the LCC based on an occurrence of a second abnormal event that overlaps in time with the abnormal event in the partition;
in response to the second increase request, activate a third core from the inactive state to the active state;
operate the second partition using the third core in the second partition temporally overlapping with the second core in the first partition after the third core has been activated; and
in response to a second predefined criteria, deactivate the third core from the active state to the inactive state.

21. The computer program product of claim 20, wherein:
the abnormal event is an initial program load of an operating system instance executing in the partition;
the predefined criteria is at least one of a completion of the abnormal event, a predefined duration since activating the second core, and a use of a predefined amount of processor power;
the resource manager includes a hypervisor that oversees creation, termination, and operation of the partition; and
the method further comprises determining by a hypervisor when an activation of the second core is beneficial to addressing the abnormal event.

* * * * *